United States Patent
Shuhong et al.

(10) Patent No.: US 8,894,878 B2
(45) Date of Patent: Nov. 25, 2014

(54) NANOPOLYMETALIC REDUCING AGENT FILLER

(75) Inventors: Liang Shuhong, New York, NY (US); Wang Meiling, Jinan (CN)

(73) Assignee: T&H USA Group, Inc., New York, NY (US)

( * ) Notice: Subject to any disclaimer, the term of this patent is extended or adjusted under 35 U.S.C. 154(b) by 550 days.

(21) Appl. No.: 13/226,914

(22) Filed: Sep. 7, 2011

(65) Prior Publication Data

US 2012/0285899 A1 Nov. 15, 2012

(30) Foreign Application Priority Data

May 12, 2011 (CN) .......................... 2011 1 0122278

(51) Int. Cl.
| | | |
|---|---|---|
| *C02F 1/28* | (2006.01) | |
| *C02F 1/68* | (2006.01) | |
| *C02F 1/70* | (2006.01) | |
| *C02F 1/00* | (2006.01) | |
| *C02F 101/30* | (2006.01) | |
| *C02F 103/30* | (2006.01) | |
| *C02F 101/20* | (2006.01) | |
| *C02F 103/34* | (2006.01) | |
| *C02F 101/38* | (2006.01) | |
| *C02F 101/36* | (2006.01) | |
| *C02F 103/40* | (2006.01) | |
| *C02F 101/32* | (2006.01) | |

(52) U.S. Cl.
CPC ............ *C02F 1/001* (2013.01); *C02F 2101/308* (2013.01); *C02F 2103/30* (2013.01); *C02F 1/683* (2013.01); *C02F 1/28* (2013.01); *C02F 1/288* (2013.01); *C02F 1/705* (2013.01); *C02F 2101/20* (2013.01); *C02F 2101/306* (2013.01); *C02F 2103/343* (2013.01); *C02F 2101/38* (2013.01); *C02F 2101/36* (2013.01); *C02F 2103/40* (2013.01); *C02F 2101/32* (2013.01)
USPC ........ 252/176; 252/178; 210/502.1; 210/503; 210/510.1

(58) Field of Classification Search
CPC ............ C02F 1/001; C02F 1/28; C02F 1/281; C02F 1/283; C02F 1/683; C02F 1/705; C02F 5/08; C02F 5/083; C02F 2101/20; C02F 2101/306; C02F 2101/32; C02F 2101/36; C02F 2101/38; C02F 2103/30; C02F 2103/343; C02F 2103/40; C02F 2305/08
USPC ............ 252/175, 176, 178; 210/500.1, 502.1, 210/501, 503, 510.1
See application file for complete search history.

(56) References Cited

U.S. PATENT DOCUMENTS

2006/0289349 A1* 12/2006 Hughes ...................... 210/500.1
2012/0168367 A1* 7/2012 Fu ................................ 210/287

FOREIGN PATENT DOCUMENTS

| CN | 1736196 A | 9/2006 |
|---|---|---|
| CN | 191531418 A | 9/2009 |
| CN | 101704596 A | 5/2010 |

* cited by examiner

*Primary Examiner* — Lucas Stelling
(74) *Attorney, Agent, or Firm* — Ohlandt, Greeley, Ruggiero & Perle, LLP

(57) ABSTRACT

The present invention provides a nanopolymetallic reducing agent filler comprising 20%-70% iron powder, 10%-30% tourmaline power, 2%-15% copper power, 3%-10% bamboo charcoal powder, 2%-15% kaoline, 2%-15% magnesite powder, 2%-15% pyrolusite powder, and 10%-30% zeolite powder. All percentages described above are by weight. A process of forming the nanopolymetallic reducing agent filler is also provided, including grinding and ball milling raw materials of each component respectively into powder particles of 10 nm-100 μm, which are then mixed uniformly by weight percentage and granulated to form a granular mixture, and sintering the granular mixture at high temperature or cold pressing it into a granular filler.

1 Claim, No Drawings

NANOPOLYMETALIC REDUCING AGENT FILLER

BACKGROUND OF THE DISCLOSURE

1. Field of the Disclosure

The invention relates to the technical field of wastewater treatment, and in particular to a filler for wastewater treatment and its formation.

2. Description of the Related Art

In 1970s, iron filings and coke were first mixed together to provide a micro-electrolysis filler for the treatment of printing and dyeing wastewater by Soviet researchers. This technology was introduced to china in 1980s. In recent 30 years, it has been applied in wastewater treatment of printing and dyeing, chemical industry, electroplating, pharmaceuticals, oilfield and the like as a result of its properties of simple process, low processing costs and excellent decoloring effect, and particularly with obvious advantages compared with other processes in the aspect of treating wastewater with high salinity, high COD and high-chroma.

However, the conventional iron-carbon micro-electrolysis technology may have many problems. For this technology, a passive film formed on the surface of the iron-carbon filler during the operation may affect the reaction. Generally, after 1 to 3 months, there is a dramatic drop of processing efficiency, the lifetime of the filler is very short, which restricts its application and promotion. Moreover, it is also an important cause of low processing efficiency (removal ratio of COD is 15-30%) of the conventional techniques that the effective contact area between filler and wastewater is reduced as a result of agglomeration and channeling which is apt to occur for conventional iron-carbon filler. Another issue affecting its promotion is that the conventional iron-carbon filler also produces large amount of scraped iron cement which may have negative influence to the surrounding environment. The most important issue is that the traditional iron carbon micro-electrolysis is deeply influenced by the application environment, and generally requires acidity regulation treatment, while the treating effect is not so obvious for quite a lot of toxic organic.

All existing processes of wastewater treatment, including iron-carbon micro-electrolysis, take the way of oxidating the pollutants in wastewater into non-toxic and harmless products. However a large number of nitro aromatic hydrocarbon compounds, azo compounds, halogenated hydrocarbon compounds and toxic and harmful heavy metals exist in the refractory wastewater such as printing and dyeing wastewater, pharmaceutical wastewater, chemical industry wastewater and pesticide wastewater. These compounds and metals described above are rich in molecular structures of double bonds, carbon double bonds, strongly electron-withdrawing groups, azo bonds, benzene rings and the like, which are difficult to be oxidized, but apt to be reduced, and the toxicity and inhibition of the reduction products to microorganisms are greatly weaken, while the biodegradability increases. For example, chlorohydrocarbon can be dechlorinated by reduction, and nitrobenzene can be degradated to be less toxic hydroxyl aniline by reduction.

If the pollutants in refractory wastewater described above can be initially decomposed by treating with reduction technology, the biodegradability of the wastewater may be greatly improved, and it is beneficial to the improvement of the efficiency of the wastewater biochemical treatment. As described so far, researches have been rarely made in this area, and technologies are not yet mature.

SUMMARY OF THE DISCLOSURE

The purpose of the present invention is to overcome the shortcomings of traditional iron-carbon micro-electrolysis filler, such as short lifetime, agglomeration, low processing efficiency, environmental susceptivity and generating more waste materials, and to provide a nanopolymetallic reducing agent filler for wastewater treatment and its formation.

A variety of low potential nanoscale metals are used as anode reductant and high potential nanoscale metals are used as the cathode in the nanopolymetallic reducing agent filler provided by the present invention.

The basic principle of the nanopolymetallic reducing agent filler is the primary cell electrochemical reaction formed by anode and cathode. The high potential metal cathode not only expands the potential difference, but also has the electrocatalysis effect, and provides reaction interface for reduction. A micro-cell system with multiple short-circuits is formed between alloy of the anode and trace impurities, it can accelerate the oxidation of the anode, and combine the complexation, electron transportation and physical adsorption of anode ion. The nanopolymetallic reducing agent filler with strong reductibility performs better reduction and degradation effects to major pollutants in wastewater such as nitro aromatic hydrocarbon compounds, azo compounds, halogenated hydrocarbons compounds and toxic and harmful heavy metals etc.

The purpose of the present invention is achieved by the technical solution as follows.

A nanopolymetallic reducing agent filler provided by the present invention, comprising 20%-70% iron powder, 10%-30% tourmaline power, 2%-15% copper power, 3%-10% bamboo charcoal powder, 2%-15% kaoline, 2%-15% magnesite powder, 2%-15% pyrolusite powder, and 10%-30% zeolite powder, all percentages described above are by weight.

The raw materials made into nano polymetallic reducing agent filler may be commercially available and their purity is required to be 98% or over.

A process of forming the nanopolymetallic reducing agent filler provided by the present invention, includes (1) grinding and ball milling raw materials of each component respectively into powder particles of 10 nm-100 μm, which are then mixed uniformly by weight percentages and granulated to form a granular mixture, and (2) sintering said granular mixture at the temperature of 500° C.-1000° C. or cold pressing it to a granular filler. The shape of said granular filler may be spherical, cylinder, cubic or any corresponding shape desired in water devices for pending treatment.

The method of applying the nanopolymetallic reducing agent filler is also provided, includes pouring the granular filler into the wastewater treatment device which may be boiling bed, aerated fluidized bed, fixed bed or any other treatment devices commonly used in the art, and then manipulating according to the operation method of the wastewater treatment device.

Chemical Oxygen Demand (COD) is used as the index of measuring the amount of organic pollutants in the water by the present invention. A greater COD shows the water is polluted by organics more seriously. The COD admeasuring apparatus typically applied in the technical field is used to measure the COD value of the waste water by the present invention.

The activity of the filler can be regenerated with activity recovery equipment from Sunshine Pharmaceutical US.

The method of applying the nanopolymetallic reducing agent filler provided by the present invention may act as a single treatment method or a biological pretreatment method. If it is applied as a way of pretreatment, the biodegradability of wastewater may be increased, and it can be directly coupled with the subsequent aerobic biological process, while surplus iron ions are in favor of removing the phosphorus and improving the settling performance of activated sludge or the film ability of biofilm process. Phosphorus may be removed by chemical precipitation and heavy metals may also be removed by reducing with this process.

Compared with the prior art, the nanopolymetallic reducing agent filler provided by the present invention has the following characters:

(1) Fast reaction rate, which takes only several minutes to tens of minutes for wastewater treatment; large capacity of treatment with a filler-water ratio of 1:1.5;

(2) Good coagulation effect, high removal ratio of COD which is typically 50%~70%, and better removal effect of chromaticity;

(3) Long lifetime, and low cost that is generally no more than 0.50 Chinese Yuan per ton;

(4) Wide range of organic pollutants affected such as refractory organic compounds with azo, carbon double bonds, nitro groups, halogenated groups; Wide range of PH value with good performance in acidic, neutral and alkaline conditions; and (5) Convenient operation and management without passivation, channeling and wastes.

Comparing each performance of the nanopolymetallic reducing agent filler provided by the present invention with that of the existing iron-carbon micro-electrolysis filler, the results shown in Table 1:

TABLE 1

| Items | Nanopolymetallic Reducing Agent Filler | Iron-Carbon Micro-electrolysis Filler |
| --- | --- | --- |
| Components | Carbon + Nanopolymetallic | Carbon + Iron |
| Activity | Degradation Rate of COD 70% | Degradation Rate of COD 20% |
| Regeneration | Yes | No |
| Agglomeration | No Agglomeration | Agglomeration |
| Lifetime | 3 Years | 3 Months |

DETAILED DESCRIPTION OF THE EMBODIMENTS

Embodiment 1

The nanopolymetallic reducing agent filler consists of the following materials by weight percentage: 40% iron powder, 10% tourmaline power, 3% copper power, 10% bamboo charcoal powder, 2% kaoline, 12% magnesite powder, 3% pyrolusite powder, and 20% zeolite powder.

First, grind and ball mill raw materials of each component respectively into powder particles of 10 microns, which are then mixed uniformly by weight percentage and finally granulated to form a granular mixture. After granulation, the granular mixture is sintered into spherical particles with diameter of 2 mm at the temperature of 600° C.

Take 10 grams of the spherical particles, add in 30 mililitres of wastewater from an acrylic plant, and stir it for 30 minutes. The major components in the wastewater needed to be degradated are acrylonitrile compounds. The waste water is measured with COD admeasuring apparatus before and after the treatment. Results show that the COD value of the wastewater from acrylic plant is reduced from 1280 to 384 with a degradation rate of 70% after the treatment with the nanopolymetallic reducing agent filler of the present invention.

Embodiment 2

The nanopolymetallic reducing agent filler consists of the following materials by weight percentage: 30% iron powder, 20% tourmaline power, 3% copper power, 10% bamboo charcoal powder, 7% kaoline, 7% magnesite powder, 3% pyrolusite powder, and 20% zeolite powder.

First, grind and ball mill raw materials of each component respectively into powder particles of 80 nanometers, which are then mixed uniformly by weight percentage, and finally granulated to form a granular mixture. After granulation, the granular mixture is sintered into spherical particles with a diameter of 3 mm at the temperature of 800° C.

Take 10 grams of the spherical particles, add in 30 mililitres of wastewater from an erythromycin pharmaceutical plant, and stir it for 30 minutes. The major components in the wastewater needed to be degradated are heterocycle compounds. The wastewater is measured with COD admeasuring apparatus before and after the treatment. Results show that the COD value of the wastewater from an erythromycin pharmaceutical plant is reduced from 3200 to 1024 with a degradation rate of 68% after the treatment with the nanopolymetallic reducing agent filler of the present invention.

Embodiment 3

The nanopolymetallic reducing agent filler consists of the following materials by weight percentage: 25% iron powder, 25% tourmaline power, 2% copper power, 8% bamboo charcoal powder, 2% kaoline, 15% magnesite powder, 5% pyrolusite powder, and 18% zeolite powder.

First, grind and ball mill raw materials of each component respectively into powder particles of 50 microns, which are then mixed uniformly by weight percentage, and finally granulated to form a granular mixture. After granulation, the granular mixture is cold pressed into cylindrical particles with a diameter of 2 cm and a height of 5 cm.

Put 1 kilograms of the nanopolymetallic reducing agent filler into the pool, add in 10 kilograms of coking wastewater, and aerate it for 30 minutes. The major components in the coking wastewater needed to be degradated are organic nitrogen compounds and aromatic compounds. The wastewater is measured with COD admeasuring apparatus before and after treatment. Results show that the COD value of the coking wastewater is reduced from 4200 to 840 with a degradation rate of 80% after the treatment with the nanopolymetallic reducing agent filler of the present invention.

Embodiment 4

The nanopolymetallic reducing agent filler consists of the following materials by weight percentage: 28% iron powder, 22% tourmaline power, 3% copper power, 9% bamboo charcoal powder, 3% kaoline, 10% magnesite powder, 5% pyrolusite powder, and 20% zeolite powder.

First, grind and ball mill raw materials of each component respectively into powder particles of 100 nanometers, which are then mixed uniformly by weight percentage, and finally granulated to form a granular mixture. After granulation, the granular mixture is cold pressed into spherical particles with a diameter of 5 mm.

Put 1 kilograms of the nanopolymetallic reducing agent filler into the pool, add in 10 kilograms of wastewater from a chemical industrial plant, and aerate it for 30 minutes. The major components in the wastewater from a chemical industrial plant needed to be degradated are organic sulfides and organic chlorides. The wastewater is measured with COD admeasuring apparatus before and after treatment. Results show that the COD value of the wastewater is reduced from 5600 to 1960 with a degradation rate of 65% after the treatment with the nanopolymetallic reducing agent filler of the present invention.

Embodiment 5

The nanopolymetallic reducing agent filler consists of the following materials by weight percentage: 24% iron powder, 26% tourmaline power, 4% copper power, 8% bamboo charcoal powder, 3% kaoline, 10% magnesite powder, 5% pyrolusite powder, and 20% zeolite powder.

First, grind and ball mill raw materials of each component respectively into powder particles of 300 nanometers, which are then mixed uniformly by weight percentage, and finally granulated to form a granular mixture. After granulation, the granular mixture is cold pressed into spherical particles with a diameter of 8 mm.

Put 1 kilograms of the nanopolymetallic reducing agent filler into the pool, add in 10 kilograms of wastewater from a municipal wastewater treatment plant, and aerate it for 30 minutes. The major components of the wastewater are domestic sewage and industrial wastewater which meets the requirement of sewage treatment plant. The wastewater is measured with COD admeasuring apparatus before and after treatment.

Results show that the COD value of the wastewater is reduced from 280 to 28 with a degradation rate of 90% after the treatment with the nanopolymetallic reducing agent filler of the present invention.

Embodiment 6

The nanopolymetallic reducing agent filler consists of the following materials by weight percentage: 40% iron powder, 20% tourmaline power, 2% copper power, 10% bamboo charcoal powder, 2% kaoline, 10% magnesite powder, 2% pyrolusite powder, and 14% zeolite powder.

First grind and ball mill raw materials of each component respectively into powder particles of 500 nanometers, which are then mixed uniformly by weight percentage, and finally granulated to form a granular mixture. After granulation, the granular mixture is cold pressed into cylinder particles with a diameter of 1 cm and a height of 2 cm.

Put 1 kilograms of the nanopolymetallic reducing agent filler into the pool, add in 10 kilograms of printing and dyeing wastewater, and aerate it for 30 minutes. The major components in the printing and dyeing wastewater needed to be degradated are aromatic compounds. The wastewater is measured with COD admeasuring apparatus before and after treatment. Results show that the COD value of the wastewater is reduced from 6500 to 2405 with a degradation rate of 63% after the treatment with the nanopolymetallic reducing agent filler of the present invention.

What is claimed is:

1. A nanopolymetallic reducing agent filler, comprising components that include 20%-40% iron powder, 10%-30% tourmaline power, 2%-15% copper powder, 3%-10% bamboo charcoal powder, 2%-15% kaoline, 2%-15% magnesite powder, 2%-15% pyrolusite powder, and 10%-30% zeolite powder, all percentages described above are by weight.

* * * * *